United States Patent
Kumegawa et al.

(10) Patent No.: US 11,745,216 B2
(45) Date of Patent: Sep. 5, 2023

(54) METHOD FOR PRODUCING FILM

(71) Applicant: JSR CORPORATION, Tokyo (JP)

(72) Inventors: Ryo Kumegawa, Tokyo (JP); Sosuke Osawa, Tokyo (JP); Miki Tamada, Tokyo (JP); Ken Maruyama, Tokyo (JP); Motohiro Shiratani, Tokyo (JP)

(73) Assignee: JSR CORPORATION, Tokyo (JP)

( * ) Notice: Subject to any disclaimer, the term of this patent is extended or adjusted under 35 U.S.C. 154(b) by 0 days.

(21) Appl. No.: 17/847,228

(22) Filed: Jun. 23, 2022

(65) Prior Publication Data

US 2023/0027151 A1 Jan. 26, 2023

(30) Foreign Application Priority Data

Jun. 28, 2021 (JP) ................. 2021-106269

(51) Int. Cl.
| | | |
|---|---|---|
| *B05D 1/00* | (2006.01) | |
| *B05D 1/32* | (2006.01) | |
| *C08J 5/18* | (2006.01) | |
| *C08F 297/02* | (2006.01) | |

(52) U.S. Cl.
CPC ............. *B05D 1/327* (2013.01); *C08J 5/18* (2013.01); *B05D 2401/10* (2013.01); *C08F 297/023* (2013.01)

(58) Field of Classification Search
CPC ............. B05D 1/327; B05D 2401/10; B05D 2202/40; B05D 7/14; B05D 3/107; B05D 3/142
See application file for complete search history.

(56) References Cited

U.S. PATENT DOCUMENTS

2013/0113082 A1* 5/2013 Enomoto ............ G03F 7/325
                                                       430/311
2020/0148845 A1   5/2020 Osaki

FOREIGN PATENT DOCUMENTS

WO   WO-2018235877 A1   12/2018

OTHER PUBLICATIONS 17847228-685289-EICSEARCH.pdf (Year: 2023).*

* cited by examiner

*Primary Examiner* — Hai Y Zhang
(74) *Attorney, Agent, or Firm* — Element IP, PLC

(57) ABSTRACT

A method for producing a film includes: coating a surface of a substrate with a composition containing a polymer having a structural unit represented by formula (1) and having a number average molecular weight of 13000 or more and a solvent, heating a coating film formed by the coating, and removing, with a rinsing liquid, a part of the coating film after the heating, wherein the rinsing liquid to be used contains a basic compound. In the formula (1), $Y^1$ is a single bond, $-CO-NR^2-$, a divalent aromatic ring group, a divalent group containing $-O-$, or a divalent group containing $-CO-NR^2-$. $A^1$ is a single bond, $-O-$, $-S-$, or $-NR^3-$. $R^1$ is a hydrogen atom, a monovalent hydrocarbon group, a monovalent halogenated hydrocarbon group, or a monovalent group having a heterocyclic structure.

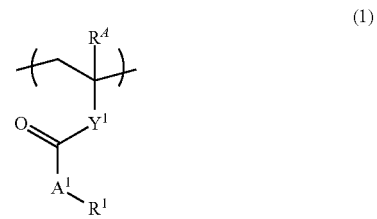

(1)

20 Claims, No Drawings

METHOD FOR PRODUCING FILM

CROSS-REFERENCE TO RELATED APPLICATIONS

The present application claims priority to Japanese Patent Application No. 2021-106269 filed on Jun. 28, 2021, the contents of which are incorporated herein.

BACKGROUND OF THE INVENTION

Field of the Invention

The present disclosure relates to a method for producing a film.

Discussion of the Background

In the process of producing semiconductors, in order to cover a part of a substrate surface region for protection, a protective film may be formed in the part of the region, and the substrate having the protective film may be subjected to treatment such as etching. Such a protective film is required to have a large film thickness, in addition to highly selective formability of the film in a part of the substrate surface to be protected (for example, refer to International Publication No. WO 2018/235877).

International Publication No. WO 2018/235877 discloses a technique in which a film is formed on a substrate from a composition that contains a polymer containing a structural unit having a nitrogen atom-containing monovalent organic group in a side chain, or a polymer containing a nitrogen atom-containing monovalent organic group bonded to at least one terminal of the main chain, and a solvent, and then a part of the film is removed by washing the film forming surface of the substrate with a rinsing liquid. In International Publication No. WO 2018/235877, formation of a film on a substrate surface followed by removal of a part of the film with a rinsing liquid as described above enables convenient and highly selective formation of a film in a part of the region in the substrate surface.

SUMMARY OF THE INVENTION

According to an aspect of the present disclosure, a method for producing a film includes: coating a surface of a substrate with a composition including a polymer and a solvent to form a coating film on the surface of the substrate, heating the coating film, and removing, with a rinsing liquid, a part of the coating film after the heating. The polymer includes a structural unit represented by formula (1), and has a number average molecular weight of 13000 or more, and the rinsing liquid contains a basic compound:

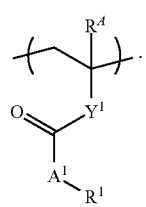

(1)

$R^A$ is a hydrogen atom, a halogen atom, an alkyl group having 1 to 8 carbon atoms, or a halogenated alkyl group having 1 to 8 carbon atoms; $Y^1$ is a single bond, —CO—NR$^2$—, a divalent aromatic ring group, a divalent group containing —O—, or a divalent group containing —CO—NR$^2$—; $R^2$ is a hydrogen atom or an alkyl group having 1 to 5 carbon atoms; $A^1$ is a single bond, —O—, —S—, or —NR$^3$—; $R^3$ is a hydrogen atom or an alkyl group having 1 to 5 carbon atoms; and $R^1$ is a hydrogen atom, a monovalent hydrocarbon group, a monovalent halogenated hydrocarbon group, or a monovalent group having a heterocyclic structure, provided that $R^1$ is not a hydrogen atom when $A^1$ is a single bond.

DESCRIPTION OF THE EMBODIMENTS

Embodiments of the present disclosure will now be described more fully hereinafter with reference to the accompanying drawing, in which some, but not all of the embodiments of the disclosure are shown.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

As means for forming a film having a sufficiently large film thickness, use of a polymer having a high molecular weight as film forming material is considered. It is, however, concerned that in a step for removing the part of a film with a rinsing liquid, the film formed in a region that is required to be removed is unable to be sufficiently removed, though the thickness of the film formed is ensured. In other words, it is concerned that the selectivity is reduced.

According to the method in the present disclosure, a film having a sufficiently large film thickness can be conveniently and highly selectively formed, as described below.

The embodiments of the method for producing a film in the present disclosure (hereinafter, also referred to as "present production method") includes the coating step, heating step and removal step, as described below.

(1) Coating step: a step of coating a surface of a substrate with a composition containing a polymer [A] and a solvent [B](hereinafter, also referred to as "film forming composition");
(2) Heating step: a step of heating a coating film formed by the coating step; and
(3) Removal step: a step of removing, with a rinsing liquid, a part of the coating film after the heating step.

The present production steps are described in detail as follows.

<(1) Coating Step>
(Substrate)

In the coating step, a surface of a substrate is coated with a film forming composition. As the substrate, a substrate having a surface layer including a first region and a second region different from the first region may be used. It is preferable that the first region and the second region be made of material different from each other. More specifically, at least some of the elements present in the surface layer in the second region is different from those in the first region.

The first region in an embodiment is a region that contains a metal element (hereinafter, also referred to as "metal-containing region"). The metal contained in the metal-containing region is not specifically limited. Examples of the metal that is contained in the metal-containing region include copper, iron, zinc, cobalt, aluminum, titanium, tin, tungsten, zirconium, tantalum, germanium, molybdenum, ruthenium, gold, silver, platinum, palladium and nickel. It is preferable that the metal-containing region contain at least one selected from the group consisting of copper, cobalt, tungsten, tantalum and ruthenium, among those. The metal contained in the metal-containing region may be an elemental metal, an alloy, a conductive nitride, or a metal oxide.

The second region in an embodiment is a region made of nonmetallic element. The second region is preferably a region containing silicon (hereinafter, also referred to as "silicon-containing region). It is preferable that the silicon-containing region have a silanol group (Si—OH), Si—H or Si—N in the surface. The silicon-containing region is a region that contains a semiconductor material such as silicon oxide, silicon nitride, and silicon oxynitride ($SiO_2$, SiOC, $Si_3N_4$, $SiN_x$, and SiON). It is preferable that the silicon-containing region have a silanol group in the surface from the viewpoint of high-density surface adsorption by the polymer [A].

The shape of the coating surface of a substrate is not particularly limited. For example, the coating surface may be in a flat shape, an arc shape, a concave shape, a convex shape, or a concave-convex shape. In the case where the coating surface has a first region and a second region, the arrangement of the first region and the second region is also not particularly limited. For example, the first region and the second region may be arranged adjacent to each other in a specific direction. Alternatively, one of the first region and the second region may constitute a bottom face or a ceiling face and the other may constitute a side face. Alternatively, one of the first region and the second region may be formed in a plurality of dots which are distributed within the other region.

Incidentally, the substrate surface to be coated with a film forming composition may be subjected to a pretreatment such as a plasma treatment using $H_2$ gas, mixture gas of $N_2$ and $H_2$, or $O_2$ gas, a washing treatment of the substrate surface, and a wet modification treatment.

(Coating Method)

Examples of the method for coating with a film forming composition include a spraying method, a roll coating method, a spin coating method, a slit die coating method, a bar coating method and an ink jetting method. Among these, a spin coating method, a slit die coating method or a bar coating method is preferred for application of the film forming composition. The thickness of the coating film to be formed on the substrate may be appropriately set such that a desired final thickness of the coating film to be formed is obtained.

(Film Forming Composition)

Subsequently, the film forming composition is described. The film forming composition used in the present production method contains a polymer [A] and a solvent [B]. The film forming composition includes a polymer [A] dissolved or dispersed preferably in a solvent [B].

<Polymer [A]>

The polymer [A] is a polymer having a structural unit represented by the following formula (1) (hereinafter, also referred to as "structural unit U1"), and having a number average molecular weight of 13000 or more:

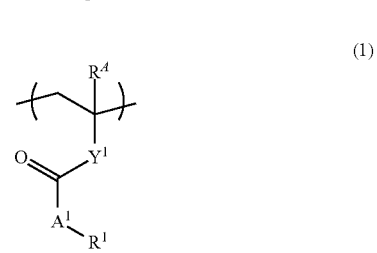

wherein $R^4$ is a hydrogen atom, a halogen atom, an alkyl group having 1 to 8 carbon atoms, or a halogenated alkyl group having 1 to 8 carbon atoms; $Y^1$ is a single bond, —CO—$NR^2$—, a divalent aromatic ring group, a divalent group containing —O—, or a divalent group containing —CO—$NR^2$—; $R^2$ is a hydrogen atom or an alkyl group having 1 to 5 carbon atoms; $A^1$ is a single bond, —O—, —S—, or —$NR^3$—; $R^3$ is a hydrogen atom or an alkyl group having 1 to 5 carbon atoms; and $R^1$ is a hydrogen atom, a monovalent hydrocarbon group, a monovalent halogenated hydrocarbon group, or a monovalent group having a heterocyclic structure, provided that $R^1$ is not a hydrogen atom when $A^1$ is a single bond.

Structural Unit U1

In the formula (1), $R^4$ is a hydrogen atom, a halogen atom, an alkyl group having 1 to 8 carbon atoms, or a halogenated alkyl group having 1 to 8 carbon atoms. Examples of the halogen atom represented by $R^4$ include a fluorine atom, a chlorine atom, a bromine atom, and an iodine atom. Examples of the alkyl group having 1 to 8 carbon atoms include a methyl group, an ethyl group, an n-propyl group, an isopropyl group, an n-butyl group, an isobutyl group, a sec-butyl group, a tert-butyl group, an n-pentyl group, an isopentyl group, an n-hexyl group, an n-heptyl group, an n-octyl group, and a 2-ethylhexyl group. Examples of the halogenated alkyl group having 1 to 8 carbon atoms include the group exemplified as the alkyl group having 1 to 8 carbon atoms in which one or more hydrogen atoms are substituted with halogen atoms.

It is preferable that $R^4$ be a hydrogen atom or a methyl group among those, from the viewpoint of copolymerizable properties of the monomer that imparts the structural unit U1.

$Y^1$ is a single bond, —CO—$NR^2$—, a divalent aromatic ring group, a divalent group containing —O—, or a divalent group containing —CO—$NR^2$—, wherein $R^2$ is a hydrogen atom or an alkyl group having 1 to 5 carbon atoms. Examples of the alkyl group represented by $R^2$ having 1 to 5 carbon atoms include a group having 1 to 5 carbon atoms among the alkyl groups having 1 to 8 carbon atoms exemplified in the description of $R^4$. $R^2$ is preferably a hydrogen atom or an alkyl group having 1 to 3 carbon atoms, more preferably a hydrogen atom or a methyl group.

The divalent aromatic ring group represented by $Y^1$ is a group obtained by removing two hydrogen atoms from the ring part of a substituted or unsubstituted aromatic ring. Examples of the aromatic ring include an aromatic hydrocarbon ring and an aromatic heterocyclic ring. Examples of the aromatic hydrocarbon ring include a benzene ring, a naphthalene ring, and an anthracene ring. Examples of the aromatic heterocycle include a nitrogen-containing heterocycle such as a pyridine ring, a pyridazine ring, and a pyrimidine ring; an oxygen-containing heterocycle such as a furan ring; and a sulfur-containing heterocycle such as thiophene. The aromatic ring in the aromatic ring group may have a substituent. Examples of the substituent include an alkyl group, an alkoxy group, and a halogen atom.

Among the above, the divalent aromatic ring group represented by $Y^1$ is preferably a group obtained by removing two hydrogen atoms from the ring part of a substituted or unsubstituted aromatic hydrocarbon ring, more preferably a substituted or unsubstituted phenylene group or naphthalene diyl group.

Examples of the divalent group containing —O— and the divalent group containing —CO—NR$^2$— represented by $Y^1$ include a divalent group obtained by substituting any methylene group in an alkane diyl group having 2 to 20 carbons with —O— or —CO—NR$^2$— under conditions that the —O— or —CO—NR$^2$— are not adjacent to each other. In this case, it is preferable that the alkane diyl group having 2 to 20 carbon atoms be in a straight chain form, and an alkane diyl group having 2 to 6 carbon atoms in a straight chain form is more preferred.

Among the above, $Y^1$ is preferably a single bond or a divalent aromatic ring group, more preferably a single bond.

$A^1$ is a single bond, —O—, —S—, or —NR$^3$—, wherein $R^3$ is a hydrogen atom or an alkyl group having 1 to 5 carbon atoms. Examples of the alkyl group having 1 to 5 carbon atoms represented by $R^3$ include a group having 1 to 5 carbon atoms among the alkyl groups having 1 to 8 carbon atoms exemplified in the description of $R^4$. Among those, $A^1$ is preferably —O— or NR$^3$—, more preferably —O—.

$R^1$ is a hydrogen atom, a monovalent hydrocarbon group, a monovalent halogenated hydrocarbon group, or a monovalent group having a heterocyclic structure. In the case where $A^1$ is a single bond, $R^1$ is a monovalent hydrocarbon group, a monovalent halogenated hydrocarbon group, or a monovalent group having a heterocyclic structure.

In the present disclosure, the "hydrocarbon group" includes a chain hydrocarbon group, an alicyclic hydrocarbon group, and an aromatic hydrocarbon group. The "chain hydrocarbon group" refers to a straight-chain hydrocarbon group and a branched-chain hydrocarbon group which are composed of chain structure alone without containing cyclic structure. The chain hydrocarbon group may be saturated or unsaturated. The "alicyclic hydrocarbon group" refers to a hydrocarbon group containing an alicyclic hydrocarbon structure without containing an aromatic ring structure as cyclic structure. The alicyclic hydrocarbon group is not required to be composed of alicyclic hydrocarbon structure alone, and a part thereof may include a chain structure. The "aromatic hydrocarbon group" refers to a hydrocarbon group containing an aromatic ring structure as ring structure. The aromatic hydrocarbon group is not required to be composed of aromatic ring structure alone, and a part thereof may include a chain structure or an alicyclic hydrocarbon structure.

Examples of the monovalent hydrocarbon group represented by $R^1$ include a monovalent chain hydrocarbon group having 1 to 20 carbon atoms, a monovalent alicyclic hydrocarbon group having 3 to 20 carbon atoms, and a monovalent aromatic hydrocarbon group having 6 to 20 carbon atoms. Specific examples of the monovalent chain hydrocarbon group having 1 to 20 carbon atoms include an alkyl group such as a methyl group, an ethyl group, an n-propyl group, an isopropyl group, an n-butyl group, an isobutyl group, a sec-butyl group, a tert-butyl group, an n-pentyl group, an isopentyl group, and an n-hexyl group; an alkenyl group such as an ethenyl group, a propenyl group, and a butenyl group; and an alkynyl group such as an ethynyl group, a propynyl group and a butynyl group.

Examples of the monovalent alicyclic hydrocarbon group having 3 to 20 carbon atoms include a monocyclic alicyclic saturated hydrocarbon group such as a cyclopentyl group and a cyclohexyl group; a monocyclic alicyclic unsaturated hydrocarbon group such as a cyclopentenyl group and a cyclohexenyl group; a polycyclic alicyclic saturated hydrocarbon group such as a norbornyl group, an adamantyl group, and a tricyclodecyl group; and a polycyclic alicyclic unsaturated hydrocarbon group such as a norbornenyl group and a tricyclodecenyl group.

Examples of the monovalent aromatic hydrocarbon group having 6 to 20 carbon atoms include an aryl group such as a phenyl group, a tolyl group, a xylyl group, a naphthyl group, and an anthryl group; and an aralkyl group such as a benzyl group, a phenethyl group, a naphthylmethyl group, and an anthrylmethyl group.

Examples of the monovalent halogenated hydrocarbon group represented by $R^1$ include a group obtained by substituting any hydrogen atom of the group exemplified as the monovalent hydrocarbon group with a halogen atom (a fluorine atom, a chlorine atom, a bromine atom, an iodine atom, etc.).

Examples of the monovalent group having a heterocyclic structure represented by $R^1$ include a group containing a substituted or unsubstituted heterocycle having 5 to 12 ring members as heterocyclic structure. The heterocycle may be an aliphatic heterocycle or aromatic heterocycle. The hetero atom that the heterocycle has is not particularly limited, and examples thereof include a nitrogen atom, an oxygen atom, and a sulfur atom.

Specific examples of the heterocycle contained in the monovalent group having a heterocyclic structure include an aliphatic heterocycle including a nitrogen-containing aliphatic heterocycle such as pyrrolidine, 2-pyrroline, 3-pyrroline, piperidine, and piperazine; an oxygen-containing aliphatic heterocycle such as tetrahydrofuran and 1,3-dioxolane; and a sulfur-containing aliphatic heterocycle such as tetrahydrothiophene, 1,3-dithiane, and 1,4-dithiane. Examples of the aromatic heterocycle include a nitrogen-containing aromatic heterocycle such as pyrrole, pyridine, pyridazine, pyrimidine, quinoline, isoquinoline, carbazole, and acridine; an oxygen-containing aromatic heterocycle such as furan and dibenzofuran; and a sulfur-containing aromatic heterocycle such as thiophene.

In terms of easy removal with a rinsing liquid due to lower adsorption capacity to the silicon-containing region, $R^1$ is preferably a monovalent hydrocarbon group or a monovalent group having an aromatic heterocyclic structure, more preferably a monovalent hydrocarbon group, and still more preferably a monovalent chain hydrocarbon group, among the above.

Specific examples of the structural unit U1 include structural units represented by the following formulas (1-1) to (1-10), respectively.

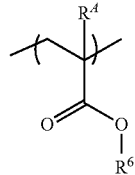

(1-1)

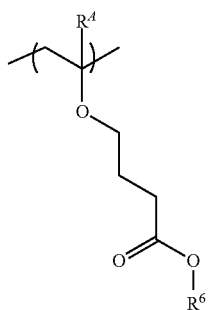

wherein $R^6$ is an alkyl group having 1 to 20 carbon atoms; $R^7$ is a hydrogen atom or an alkyl group having 1 to 20 carbon atoms; and $R^A$ is the same as in the formula (1).

The polymer [A] may have the structural units U1 randomly, or may have a block made of the structural units U1, in the molecule. The polymer [A] having the block made of the structural units U1 is suitable in terms of high adsorption capacity of the organic film formed of film forming composition to a substrate.

The content of the structural unit U1 in the polymer [A] relative to the total structural units constituting the polymer [A] is preferably 50 mol % or more, more preferably 60 mol % or more, and still more preferably 80 mol % or more. The content of the structural unit U1 in the range is suitable, allowing the etching resistance of the organic film formed on a substrate to be sufficiently enhanced. The structural unit U1 that the polymer [A] has may consist of one type or two or more types.

Other Structural Unit

The polymer [A] may have a structural unit different from the structural unit U1 (hereinafter, also referred to as "another structural unit"), together with the structural unit U1. The monomer that imparts another structural unit is not particularly limited, as long as being copolymerizable with the monomer that imparts the structural unit U1. Examples of the monomer that imparts another structural unit include a monomer having a polymerizable carbon-carbon unsaturated bond, and specific examples thereof include an aromatic vinyl compound, an alkene, a vinylcycloalkane, and a cycloalkene.

Specific examples of the monomer include an aromatic vinyl compound such as styrene, 2-methylstyrene, 3-methylstyrene, 4-methylstyrene, α-methylstyrene, 2,4-dimethylstyrene, 2,4-diisopropylstyrene, 5-t-butyl-2-methylstyrene, divinylbenzene, trivinylbenzene, t-butoxystyrene, vinylbenzyl dimethylamine, (4-vinylbenzyl)dimethyl aminoethyl ether, N,N-dimethylaminoethyl styrene, N,N-dimethylaminomethyl styrene, 2-ethylstyrene, 3-ethylstyrene, 4-ethylstyrene, 2-t-butylstyrene, 3-t-butylstyrene, 4-t-butylstyrene, diphenylethylene, and vinylnaphthalene; an alkene such as propene, butene, and pentene; a vinylcycloalkane such as vinylcyclopentane and vinylcyclohexane; and a cycloalkene such as cyclopentene and cyclohexene. In addition to the above, examples of the monomer that imparts another structural unit include 4-hydroxy-1-butene, vinyl glycidyl ether, and vinyl trimethylsilyl ether.

As the monomer that imparts another structural unit, a monomer having a cross-linkable group may be used in addition to the above. In the present disclosure, the "cross-linkable group" refers to a functional group that forms a covalent bond through a reaction between the same type of groups or between different types of groups under specified conditions (for example, under heating conditions, under active energy ray irradiating conditions, and under oxidizing conditions) to form a cross-linking structure. The polymer [A] having a cross-linkable group is suitable, because an organic film having high film strength and heat resistance can be formed.

Examples of the cross-linkable group include a group having a carbon-carbon unsaturated bond, a group having a condensed ring structure between an aromatic ring and a cyclobutane ring, a cyclic ether group, and a cyclic carbonate group. Specific examples thereof include a group having a carbon-carbon unsaturated bond such as a vinyl group, a vinyloxy group, an allyl group, a (meth)acryloyl group, and a vinylphenyl group; a group having a condensed ring structure between an aromatic ring and a cyclobutane ring such as a group having a condensed ring structure between a cyclobutane ring and a benzene ring and a group having a condensed ring structure between a cyclobutane ring and a naphthalene ring; and a cyclic ether group such as an oxiranyl group and an oxetanyl group. Among these, it is preferable that the cross-linkable group be a group having a carbon-carbon unsaturated bond or a group having a condensed ring structure between an aromatic ring and a cyclobutane ring, because a cross-linked structure is easily formed by heating and the film strength and heat resistance can be further enhanced. As the monomer having a cross-linkable group, a vinyl compound having a polymerizable carbon-carbon double bond and a vinyl compound having a condensed ring structure between an aromatic ring and a cyclobutane ring are preferred, and allylstyrene and 4-vinylbenzocyclobutene are particularly preferred. The "(meth) acryloyl" includes acryloyl and methacryloyl.

In the case where the polymer [A] contains a structural unit having a cross-linkable group, the content of the structural unit having a cross-linkable group relative to the total structural units constituting the polymer [A] is preferably 20 mol % or less, more preferably 15 mol % or less, and still more preferably 10 mol % or less. The other structural units that the polymer [A] has may be one type of the above or two or more types thereof.

Terminal Structure of Polymer [A]

It is preferable that the polymer [A] have at least one functional group selected from the group consisting of a group having a carbon-carbon unsaturated bond, a carboxy group, a cyano group, an alcoholic hydroxy group, a thiol group, $-NR^4R^5$, $-CO-NR^4R^5$, $-SO_2R^4$, $-P(=O)(OR^4)(OR^5)$, and a group having a nitrogen-containing heterocycle (hereinafter, also referred to as "specific functional group") at a polymer chain terminal part. In the formula, $R^4$ and $R^5$ are each independently a hydrogen atom or monovalent hydrocarbon group having 1 to 6 carbon atoms. Due to having a specific functional group in a polymer chain terminal part, the polymer [A] is suitable in terms of highly selective and dense adsorption to a specified region on a substrate surface.

In particular, the specific functional group has high interaction with a metal-containing region, being suitable in terms of highly selective and dense modification of the metal-containing region. In this case, examples of the "interaction" include a chemical bond such as a covalent bond, an ionic bond, and a coordinate bond. A specific functional group that can be coordinate bonded to a metal-containing region is preferred among these, because the bonding strength between the metal atom and the specific functional group is larger.

In the case where the polymer [A] has a group having a carbon-carbon unsaturated bond at a main chain terminal, examples of the group having the carbon-carbon unsaturated bond include a group having a carbon-carbon double bond and a group having a carbon-carbon triple bond. Specific examples of the group having a carbon-carbon double bond include an ethenyl group, a 2-propenyl group, a 2-butenyl group, a 3-butenyl group, a 1-butyne-1-yl group and a phenylethynyl group; and specific examples of the group having a carbon-carbon triple bond include an ethynyl group, a prop-2-yn-1-yl group, a but-2-yn-1-yl group, a but-3-yn-1-yl group, a phenylethynyl group, and a 4-phenyl-2-but-1-yl group. Among these, a group having a carbon-carbon triple bond is preferred as the group having a carbon-carbon unsaturated bond to be introduced at the main chain terminal of the polymer [A], in terms of a large interaction with a metal atom such as tungsten, which allows a metal-containing region to be modified highly selectively and densely.

Examples of the monovalent hydrocarbon group having 1 to 6 carbon atoms represented by $R^4$ and $R^5$ include an alkyl group having 1 to 6 carbon atoms, an alkenyl group having 2 to 6 carbon atoms, a cycloalkyl group having 3 to 6 carbon atoms, and a phenyl group.

In the case where the polymer [A] has a group having a nitrogen-containing heterocycle at the main chain terminal, the nitrogen-containing heterocycle may be an aliphatic heterocycle or may be an aromatic heterocycle. Specific examples of the group having a nitrogen-containing heterocycle include a nitrogen-containing aliphatic heterocycle such as an azacyclopentyl group, an azacyclohexyl group, and a 3,3,5,5-tetramethyl azacyclohexyl group; and a nitrogen-containing aromatic heterocycle such as a pyrrolyl group, a pyridyl group, a pyradyl group, a pyrimidyl group, a pyridazyl group, a quinolyl group, an isoquinolyl group, a pyrolylmethyl group, a 2-pyrolylethyl group, a pyridylmethyl group, and a 2-pyridylethyl group.

The polymer [A] may have a specific functional group at only one terminal of the polymer chain, or may have specific functional groups at both terminals. It is preferable that the polymer [A] have a specific functional group at one of the terminals of the main chain, from the viewpoint of enlarging the film thickness and film density of the organic film formed of the polymer [A].

Production of Polymer [A]

The polymer [A] may be produced, for example, from monomers that allow the respective structural units described above to be introduced in the presence of a polymerization initiator in an appropriate solvent by a known polymerization method (for example, radical polymerization and anionic polymerization). The aspect of the polymerization for obtaining the polymer [A] is not particularly limited, and examples thereof include random polymerization and block polymerization. Among these, anionic polymerization is preferred for obtaining a polymer having a block of the structural unit U1, and radical polymerization is preferred for obtaining a random copolymer.

In the case of anionic polymerization, examples of the polymerization initiator include an alkyl lithium, an alkyl magnesium halide, naphthalene sodium, an alkylated lanthanoid compound; a potassium alkoxide such as t-butoxy potassium; an alkyl zinc such as dimethyl zinc: an alkyl aluminum such as trimethyl aluminum; and an aromatic metal compound such as benzyl potassium. Among these, an alkyl lithium is preferably used as polymerization initiator in an anionic polymerization. The amount of the polymerization initiator used is preferably 0.01 to 30 parts by mass relative to 100 parts by mass of the total amount of the monomers used in the reaction.

Examples of the polymerization solvent include an alkane such as n-hexane; a cycloalkane such as cyclohexane; an aromatic hydrocarbon such as toluene; a saturated carboxylic acid ester such as ethyl acetate, n-butyl acetate, i-butyl acetate, and methyl propionate; a ketone such as 2-butane acetate, and cyclohexanone; and an ether such as tetrahydrofuran and dimethoxyethane. A single type or two or more types of polymerization solvents may be used. It is preferable that the amount of the polymerization solvent used be controlled such that the total amount of the monomers used in the reaction is 0.1 to 60 mass % relative to the total amount of the reaction solution.

The reaction temperature in the anionic polymerization may be appropriately selected depending on the type of the polymerization initiator. The reaction temperature in the anionic polymerization is preferably −150° C. or more, more preferably −80° C. or more, from the viewpoint of sufficient progress of the reaction. Further, the reaction temperature is preferably 50° C. or less, more preferably 40° C. or less, from the viewpoint of suppression of a side reaction. The reaction time is preferably 5 minutes to 24 hours, more preferably 20 minutes to 12 hours.

In the case of a radical polymerization, examples of the polymerization initiator include an azo compound such as 2,2'-azobis(isobutyronitrile), 2,2'-azobis(2,4-dimethylvaleronitrile), and 2,2'-azobis(isobutyric acid)dimethyl. The amount of the polymerization initiator used is preferably 0.01 to 30 parts by mass relative to 100 parts by mass of the total amount of the monomers used in the reaction. Examples of the polymerization solvent include alcohols, ethers, ketones, esters, and hydrocarbons. It is preferable that the amount of the polymerization solvent used be controlled, such that the total amount of the monomers used in the reaction is 0.1 to 60 mass % relative to the total amount of the reaction solution.

In the radical polymerization, the reaction temperature is usually 30° C. to 180° C. The reaction time is usually 0.5 to 10 hours, though being different depending on the type of the polymerization initiator and polymer or on the reaction temperature.

In order to introduce a specific functional group to the main chain terminal of the polymer [A], the active terminal of the polymer may be treated with a terminal treatment agent for imparting the specific functional group. Examples of the terminal treatment agent for imparting a group having a carbon-carbon unsaturated bond include a halogenated product containing a carbon-carbon unsaturated bond (for example, propargyl bromide and allyl bromide).

The polymer obtained by the polymerization reaction in the state dissolved in the reaction solution may be directly used for preparation of a film forming composition, or the polymer may be isolated from the reaction solution and then used for preparation of a film forming composition. The isolation of the polymer may be performed by a known isolation method. Specific examples of the isolation method of the polymer include a method including pouring the reaction solution into a large amount of poor solvent and drying resulting precipitates under reduced pressure, and a method including distilling the reaction solution under reduced pressure with an evaporator.

The polymer [A] has a polystyrene-converted number average molecular weight (Mn) by gel permeation chromatography (GPC) of 13000 or more. With an Mn of less than 13000, an insufficient film thickness is concerned. From the viewpoint of forming an organic film having a sufficient film thickness, Mn of the polymer [A] is preferably 15000 or more, more preferably 18000 or more, and still more preferably 20000 or more. Further, from the viewpoint of improving the film formability, Mn of the polymer [A] is preferably 50000 or less, more preferably 40000 or less, and still more preferably 35000 or less.

The molecular weight distribution (Mw/Mn) represented by the ratio between the weight average molecular weight (Mw) and the number average molecular weight (Mn) is preferably 4.0 or less, more preferably 3.0 or less, and still more preferably 2.5 or less.

<Solvent [B]>

It is preferable that the solvent [B] be an organic solvent which can dissolve or disperse the polymer [A] and other components compounded on an as needed basis, and is nonreactive with each of the components. Examples of the solvent [B] include alcohols, ethers, ketones, amides, esters, and hydrocarbons.

Specific examples of the alcohols include aliphatic monoalcohols having 1 to 18 carbon atoms such as 4-methyl-2-pentanol and n-hexanol; alicyclic monoalcohols having 3 to 18 carbon atoms such as cyclohexanol; polyhydric alcohols having 2 to 18 carbon atoms such as 1,2-propylene glycol; and polyhydric alcohol partial ethers having 3 to 19 carbon atoms such as propylene glycol monomethyl ether.

Examples of the ethers include dialkyl ethers such as diethyl ether, dipropyl ether, dibutyl ether, dipentyl ether, diisoamyl ether, dihexyl ether, and diheptyl ether; cyclic ethers such as tetrahydrofuran and tetrahydropyran; and aromatic ring-containing ethers such as diphenyl ether and anisole(methylphenyl ether).

Examples of the ketones include chain ketones such as acetone, methyl ethyl ketone, methyl n-propyl ketone, methyl n-butyl ketone, diethyl ketone, methyl iso-butyl ketone, 2-heptanone (methyl n-pentyl ketone), ethyl n-butyl ketone, methyl n-hexyl ketone, di-isobutyl ketone, and trimethyl nonanone; cyclic ketones such as cyclopentanone, cyclohexanone, cycloheptanone, cyclooctanone, and methyl cyclohexanone; 2,4-pentadione, acetonitrile acetone, and acetophenone.

Examples of the amides include cyclic amides such as N,N'-dimethyl imidazolidinone and N-methyl pyrrolidone; and chain amides such as N-methylformamide, N,N-dimethylformamide, N,N-diethylformamide, acetoamide, N-methyl acetoamide, N,N-dimethyl acetoamide, and N-methyl propionic amide.

Examples of the esters include monocarboxylic acid esters such as n-butyl acetate and ethyl lactate; polyhydric alcohol carboxylates such as propylene glycol acetate; polyhydric alcohol partial ether carboxylates such as propylene glycol monomethyl ether acetate; lactones such as 7-butyrolactone and 8-valerolactone; polyhydric carboxylic acid diesters such as diethyl oxalate; and carbonates such as dimethyl carbonate, diethyl carbonate, ethylene carbonate, and propylene carbonate.

Examples of the hydrocarbons include aliphatic hydrocarbons having 5 to 12 carbon atoms such as n-pentane, and n-hexane; and aromatic hydrocarbons having 6 to 16 carbon atoms such as toluene and xylene.

Among these, the solvent [B] is preferably at least one selected from the group consisting of alcohols, ethers, ketones, and esters, more preferably at least one selected from the group consisting of ketones and esters, and still more preferably esters. As the solvent [B], one type may be used alone, or two or more types may be used in combination.

The amount of the polymer [A] contained in the film forming composition relative to the total amount of the polymer [A] and the solvent [B] is preferably 0.1 mass % or more, more preferably 0.2 mass % or more, and still more preferably 0.5 mass % or more. With a content of the polymer [A] of 0.1 mass % or more, an organic film having a sufficiently large film thickness can be formed on a substrate. Further, the content of the polymer [A] relative to the total amount of the polymer [A] and the solvent [B] is preferably 30 mass % or less, more preferably 20 mass % or less, and still more preferably 10 mass % or less. With a content of the polymer [A] of 30 mass % or less, the film thickness of an organic film is prevented from excessively increasing and the viscosity of the film forming composition is prevented from excessively increasing, so that good coating properties can be ensured. As the polymer [A], one type may be used alone, or two or more types may be used in combination.

<Other Components>

The present composition may further contain other components in addition to the polymer [A] and the solvent [B] described above (hereinafter, also referred to as "other components"). Examples of the other components include a polymer not having the partial structure represented by the formula (1), a surfactant (a fluorine-based surfactant, a silicone-based surfactant, a nonionic surfactant, etc.) and an antioxidant. The amount of the other components compounded is appropriately selected depending on each of the components within a range not impairing the effect of the present disclosure.

The solid content of the film forming composition (the ratio of the total mass of the components other than the solvent [B] in the composition relative to the total mass of the composition) may be appropriately set in consideration of the viscosity, volatility, etc. The solid content of the film forming composition is preferably in the range of 0.1 to 30 mass %. A solid content of 0.1 mass % or more is suitable, because the film thickness of the organic film can be sufficiently secured. A solid content of 30 mass % or less is suitable, because the film thickness of an organic film is prevented from excessively increasing and the viscosity of the film forming composition can be appropriately increased to ensure good coating properties. The solid content of the film forming composition is more preferably 0.5 to 20 mass %, and still more preferably 0.7 to 10 mass %.

<(2) Heating Step>

In the heating step, the coating film formed in the coating step is heated. Thereby, the solvent is removed from the film forming composition applied to the substrate surface, so that an organic film containing the polymer [A] is formed on the substrate surface. In the case where the substrate having a first region and a second region is used, the first region and the second region are coated with a film forming composition, and the coating film is heated in the heating step to form the organic film that covers the first region and the second region.

The heating treatment may be performed by using a heating unit such as an oven and a hot plate. In the heating step, the heating temperature is preferably 80° C. or more, more preferably 100° C. or more, and still more preferably 120° C. or more. The heating temperature is preferably 230° C. or less, more preferably 200° C. or less, and still more preferably 180° C. or less. The heating time is preferably 0.5 to 60 minutes, more preferably 1 to 30 minutes.

<(3) Removal Step>

In the removal step, a part of the coating film after the heating step is removed with a rinsing liquid. Thereby, a part of the substrate surface coated with the film forming composition may be selectively protected with the organic film containing the polymer [A].

(Rinsing Liquid)

The rinsing liquid used in the removal step contains a basic compound. As the basic compound, a compound having an acid dissociation constant (pKa) of 5.2 or more may be preferably used. An acid dissociation constant of a basic compound of 5.2 or more is suitable, because an organic film formed on one of the first region and the second region with different surface conditions from each other may be selectively peeled. From the viewpoint of further enhancing the peeling properties of the organic film, the acid dissociation constant of a basic compound is more preferably 5.5 or more, still more preferably 6.0 or more, and particularly preferably 7.0 or more. Incidentally, the acid dissociation constant of a basic compound herein is a value at 25° C.

The basic compound is preferably at least one selected from the group consisting of an amine compound, an aromatic heterocyclic compound, ammonia, and ammonium hydroxide, and more preferably at least one selected from the group consisting of an amine compound, an aromatic heterocyclic compound, ammonia, and ammonium hydroxide, having an acid dissociation constant of 5.2 or more.

As specific examples of the basic compound, examples of the amine compound include a chain amine such as methylamine, ethylamine, propylamine, butylamine, pentylamine, 1,3-propane diamine, trimethylamine, triethylamine, N,N-diisopropylethylamine, 1-aminoundecane, stearylamine, dimethylstearylamine, laurylamine, dimethyllaurylamine, oleylamine, and dimethyloctylamine; and a cyclic amine such as cyclohexyl amine, piperidine, piperazine, 1,2,3-triazole, purine, 1,4-diazabicyclo[2,2,2]octane(triethylenediamine), quinuclidine, morpholine, diazabicycloundecene (DBU), diazabicyclonene (DBN), and N,N-dimethyl-4-aminopyridine (DMAP).

Examples of the aromatic heterocyclic compound include pyridine, pyrrole, imidazole, and acridine.

Examples of the ammonium hydroxide include tetramethylammonium hydroxide, tetrabutylammonium hydroxide, tetrahexyl ammonium hydroxide, trimethylphenyl ammonium hydroxide, and corrin(2-hydroxyethyltrimethyl ammonium hydroxide). As the basic compound, one type may be used alone, or two or more types may be used in combination.

Since a film containing the polymer [A] can be selectively arranged on a substrate, the basic compound is preferably at least one selected from the group consisting of an amine compound, ammonia, and ammonium hydroxide among the above, and more preferably at least one selected from the group consisting of an amine compound and ammonia. Among these, at least one selected from the group consisting of diazabicycloundecene, 1,4-diazabicyclo[2,2,2]octane, tetramethylammonium hydroxide, tetrabutylammonium hydroxide, and ammonia may be preferably used, and at least one selected from the group consisting of diazabicycloundecene (pKa=8.8), 1,4-diazabicyclo[2,2,2]octane (pKa=12.5) and ammonia (pKa=9.25) may be particularly preferably used.

(Solvent [D])

It is preferable that the rinsing liquid be a liquid composition including a basic compound dissolved or dispersed in a solvent. In other words, it is preferable that the rinsing liquid contain a basic compound and a solvent. The solvent (hereinafter, also referred to as "solvent [D]") is preferably capable of dissolving the polymer [A], and more preferably being an organic solvent capable of dissolving the polymer [A] and the basic compound. Examples of the solvent [D] include alcohols, ethers, ketones, amides, esters, and hydrocarbons. Specific examples thereof include the same compounds as the organic solvents exemplified as the solvent [B]. The solvent [D] is preferably at least one selected from the group consisting of alcohols, ethers, ketones, amides, esters, and hydrocarbons. Among these, at least one selected from the group consisting of esters and ketones is preferred, and esters are more preferred. The solvent [D] may be the same as or different from the solvent [B].

The content of the basic compound in the rinsing liquid relative to the total mass of the rinsing liquid is preferably 0.05 mass % or more, more preferably 0.1 mass % or more, and still more preferably 0.2 mass % or more. A content of the basic compound of 0.05 mass % or more is preferred, because the organic film formed from the polymer [A] on a substrate in a region required to be removed can be sufficiently peeled. The content of the basic compound relative to the total mass of the rinsing liquid is preferably 20 mass % or less, more preferably 15 mass % or less, and still more preferably 10 mass % or less. With a content of the basic compound controlled to 20 mass % or less, the effect of use of an excessive amount of the basic compound on the film allowed to remain on the substrate can be suppressed.

The removal of a part of the coating film after the heating step may be performed by contacting the coating film with the rinsing liquid. The method for contacting the coating film with the rinsing liquid is not particularly limited, and, for example, a shower method, a spray method, a dip (immersion) method, or a paddle (fill-up) method may be used. In contacting the coating film with the rinsing liquid, in order to reduce the residual amount of the film formed from the polymer [A] on the substrate as much as possible, for example, supply of the rinsing liquid onto the substrate to make contact with the substrate may be performed several times, or the rinsing liquid may be shaken. In contacting the coating film with the rinsing liquid, the temperature is, for example, 5 to 50° C. The contact time is, for example, 5 seconds to 30 minutes. The amount of the rinsing liquid used is appropriately set in consideration of the method for contacting the coating film with the rinsing liquid. After contacting the coating film with the rinsing liquid, the rinsing liquid on the substrate may be removed with a spin coater or the like.

In the case where the substrate has a first region and a second region, the region that is removed from the substrate surface with the rinsing liquid may be any one of the first region and the second region. In the case where the region that is removed with the rinsing liquid is the second region, it is preferable that the second region be a silicon-containing region, because the peeling of the film can be highly selectively performed with the rinsing liquid.

For example, in the case where a substrate having a metal-containing region as the first region and a silicon-containing region as the second region is coated with the film forming composition of the present disclosure to form a coating film, and the coating film is contacted with the rinsing liquid after heating, the coating film formed on the metal-containing region remains as it is without removal with the rinsing liquid. On the other hand, the coating film formed on the silicon-containing region is removed with the rinsing liquid. Thereby, of the metal-containing region and the silicon-containing region on the substrate, the metal-containing region may be covered with a protective film containing the polymer [A]. The protective film has a sufficiently large film thickness, so that the metal-containing region can be sufficiently protected with the protective film containing the polymer [A], even when, for example, an etching treatment is performed after formation of the film.

The film thickness of the organic film formed on the substrate after treatment of the rinsing liquid is preferably 3.8 nm or more, more preferably 4.0 nm or more, still more preferably 4.5 nm or more, and furthermore preferably 5.0 nm or more. The film thickness of the organic film formed on the substrate is, for example, 30 nm or less, preferably 25 nm or less.

According to the present production method, when the rinsing liquid is contacted with the film forming surface of the substrate in the removal step, the film on a part of the substrate surface can be sufficiently removed, so that a film having a large film thickness can be conveniently and highly selectively formed. Although the reason is not clear, and without wishing to be bound by any theory, for example, the following may be conceivable. The polymer [A] has an ester oxygen as hydrogen bond acceptor in the structural unit U1. It is presumed that although the individual ester oxygens have weak interaction, the interaction with the substrate surface occurs at many points of a polymer chain, so that the polymer [A] adsorbs the substrate surface. Focusing on this point, the rinsing liquid contains a basic compound in the present production method. It is presumed that in the removal step with use of the rinsing liquid, the interaction between the ester oxygen that the polymer [A] has and the substrate surface is replaced with the interaction between the basic compound in the rinsing liquid and the substrate surface, so that the polymer [A] can conveniently and sufficiently peeled from the substrate surface.

According to the present production method described above, a film having a sufficiently large film thickness can be conveniently and highly selectively formed on a substrate. The present production method can be suitably used in a processing of semiconductor devices, of which miniaturization is expected to further proceed in the days ahead.

EXAMPLES

The present disclosure is specifically described based on Examples in the following, though the present disclosure is not limited thereto. The measurement method of each of the physical properties is described as follows.

[Weight Average Molecular Weight (Mw) and Number Average Molecular Weight (Mn)]

The weight average molecular weight (Mw) and the number average molecular weight (Mn) of a polymer was measured by gel permeation chromatography (GPC) with use of GPC columns manufactured by Tosoh Corporation (two "G2000HXL", one "G3000HXL", and one "G4000HXL") under the following conditions.

| Eluent: | tetrahydrofuran (manufactured by FUJIFILM Wako Pure Chemical Corporation) |
|---|---|
| Flow rate: | 1.0 mL/min |
| Sample concentration: | 1.0 mass % |
| Amount of sample injected: | 100 μL |
| Column temperature: | 40° C. |
| Detector: | differential refractometer |
| Reference substance: | monodisperse polystyrene |

<Synthesis of Polymer [A]>

Synthesis Example 1 (Synthesis of Polymer (A-1))

Into a vacuum dried 500-mL flask reaction vessel, 120 g of distillation-dehydrated tetrahydrofuran was injected under nitrogen atmosphere, and cooled to −78° C. Subsequently, into the tetrahydrofuran, 0.51 mL (0.56 mmol) of 1 N cyclohexane solution of sec-butyl lithium (sec-BuLi) was injected. Subsequently, 0.24 mL (1.69 mmol) of 1,1-diphenylethylene and 2.3 mL (1.13 mmol) of 0.5 N lithium chloride tetrahydrofuran solution were added thereto, and stirred for 3 minutes. Further, 15.6 mL (147 mmol) of methylmethacrylate was dropped and stirred for 1 hour, and then 0.13 mL (1.7 mmol) of propargyl bromide was injected to cause a termination reaction at the polymerization terminal. The reaction solution was heated to room temperature, and to the resulting reaction solution, 150 g of methyl isobutyl ketone (MIBK) and 2 wt % oxalic acid solution were added. The mixture was subjected to liquid separation. Then, washing with water was performed 5 times using 150 g ultra-pure water, and neutrality of the water layer was confirmed. The resulting organic layer was condensed and the solvent was displaced with tetrahydrofuran. The resulting resin solution was dropped into 500 g of hexane, so that a polymer was precipitated. A solid was collected with a Buchner funnel. The solid was dried under reduced pressure at 60° C., so that 14.5 g of a white polymer represented by the following formula (A-1) was obtained. The polymer (A-1) had an Mn of 26800 and an Mw/Mn of 1.03.

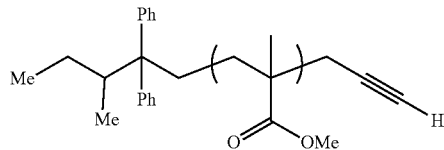

A-1

Synthesis Example 2 (Synthesis of Polymer (A-2))

Into a vacuum dried 500-mL flask reaction vessel, 120 g of distillation-dehydrated tetrahydrofuran was injected under nitrogen atmosphere, and cooled to −78° C. Subsequently, into the tetrahydrofuran, 0.39 mL (0.43 mmol) of 1 N cyclohexane solution of sec-butyl lithium (sec-BuLi) was injected. Subsequently, 0.18 mL (1.28 mmol) of 1,1-diphenylethylene and 1.7 mL (0.85 mmol) of 0.5 N lithium chloride tetrahydrofuran solution were added thereto, and stirred for 3 minutes. Further, 10.6 mL (99.9 mmol) of methylmethacrylate was dropped and stirred for 1 hour, and then 0.9 mL (6.6 mmol) of trifluoromethyl methacrylate was dropped and stirred for 1 hour. Then 0.11 mL (1.3 mmol) of allyl bromide was injected to cause a termination reaction at the polymerization terminal. The reaction solution was heated to room temperature, and to the resulting reaction solution, 150 g of MIBK and 2 wt % oxalic acid solution were added. The mixture was subjected to liquid separation. Then, washing with water was performed 5 times using 150 g ultra-pure water, and neutrality of the water layer was confirmed. The resulting organic layer was condensed and the solvent was displaced with tetrahydrofuran. The resulting resin solution was dropped into 500 g of hexane, so that a polymer was precipitated. A solid was collected with a Buchner funnel. The solid was dried under reduced pressure at 60° C., so that 11.0 g of a white polymer represented by the following formula (A-2) was obtained. The polymer (A-2) had an Mn of 25800 and an Mw/Mn of 1.03.

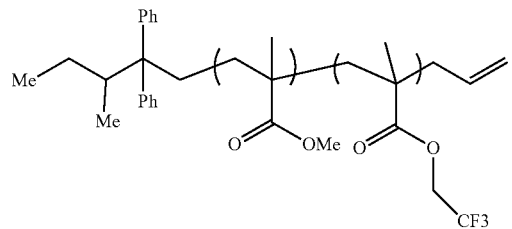

A-2

Synthesis Example 3 (Synthesis of Polymer (A-3))

Into a vacuum dried 500-mL flask reaction vessel, 120 g of distillation-dehydrated tetrahydrofuran was injected under nitrogen atmosphere, and cooled to −78° C. Subsequently, into the tetrahydrofuran, 0.51 mL (0.56 mmol) of 1 N cyclohexane solution of sec-butyl lithium (sec-BuLi) was injected. Subsequently, 0.24 mL (1.69 mmol) of 1,1-diphenylethylene and 2.3 mL (1.13 mmol) of 0.5 N lithium chloride tetrahydrofuran solution were added thereto, and stirred for 3 minutes. Further, 15.6 mL (147 mmol) of methylmethacrylate was dropped and stirred for 1 hour, and then 0.24 mL (1.7 mmol) of dimethyl methylmethacrylate was injected to cause a termination reaction at the polymerization terminal. The reaction solution was heated to room temperature, and to the resulting reaction solution, 150 g of MIBK and 2 wt % oxalic acid solution were added. The mixture was subjected to liquid separation. Then, washing with water was performed 5 times using 150 g ultra-pure water, and neutrality of the water layer was confirmed. The resulting organic layer was condensed and the solvent was displaced with tetrahydrofuran. The resulting resin solution was dropped into 500 g of hexane, so that a polymer was precipitated. A solid was collected with a Buchner funnel. The solid was dried under reduced pressure at 60° C., so that 14.5 g of a white polymer represented by the following formula (A-3) was obtained. The polymer (A-3) had an Mn of 27300 and an Mw/Mn of 1.03.

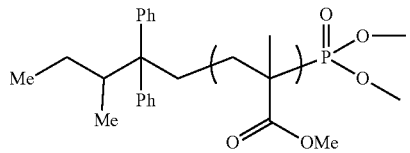

A-3

Synthesis Example 4 (Synthesis of Polymer (A-4))

Into a vacuum dried 500-mL flask reaction vessel, 120 g of distillation-dehydrated tetrahydrofuran was injected under nitrogen atmosphere, and cooled to −78° C. Subsequently, into the tetrahydrofuran, 0.95 mL (1.05 mmol) of 1.1 N cyclohexane solution of sec-butyl lithium (sec-BuLi) was injected. Subsequently, 0.45 mL (3.15 mmol) of 1,1-diphenylethylene and 4.2 mL (2.10 mmol) of 0.5 N lithium chloride tetrahydrofuran solution were added thereto, and stirred for 3 minutes. Further, 14.3 mL (135 mmol) of methylmethacrylate was dropped and stirred for 1 hour, and then 0.12 mL (1.6 mmol) of propargyl bromide was injected to cause a termination reaction at the polymerization terminal. The reaction solution was heated to room temperature, and to the resulting reaction solution, 150 g of MIBK and 2 wt % oxalic acid solution were added. The mixture was subjected to liquid separation. Then, washing with water was performed 5 times using 150 g ultra-pure water, and neutrality of the water layer was confirmed. The resulting organic layer was condensed and the solvent was displaced with tetrahydrofuran. The resulting resin solution was dropped into 500 g of hexane, so that a polymer was precipitated. A solid was collected with a Buchner funnel. The solid was dried under reduced pressure at 60° C., so that 14.5 g of a white polymer represented by the following formula (A-4) was obtained. The polymer (A-4) had an Mn of 12200 and an Mw/Mn of 1.03.

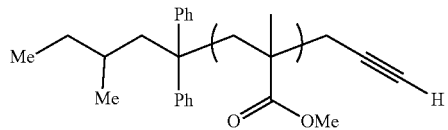

A-4

<Preparation of Film Forming Composition>

The polymer [A] and the solvent [B] for use in the preparation of the film forming composition (composition (I)) are shown in the following.

(Polymer [A])

A-1: polymer synthesized in Synthesis Example 1 (Mn = 26800, Mw/Mn = 1.03)
A-2: polymer synthesized in Synthesis Example 2 (Mn = 25800, Mw/Mn = 1.03)
A-3: polymer synthesized in Synthesis Example 3 (Mn = 27300, Mw/Mn = 1.03)
A-4: polymer synthesized in Synthesis Example 4 (Mn = 12200, Mw/Mn = 1.03)

(Solvent [B])

B-1: propylene glycol monomethyl ether acetate

Preparation Examples 1 to 4

With use of the polymer [A] and the solvent [B] shown in the following Table 1, 100 parts by mass of the polymer [A] and 900 parts by mass of the solvent [B] were mixed. The resulting mixture solution was filtrated with a membrane filter having a pore diameter of 200 nm, so that the composition (I) shown in the Table 1 was prepared as the film forming composition.

TABLE 1

| | Composition (I) | Polymer [A] | Solvent [B] |
|---|---|---|---|
| Preparation Example 1 | (I-1) | (A-1) | (B-1) |
| Preparation Example 2 | (I-2) | (A-2) | (B-1) |
| Preparation Example 3 | (I-3) | (A-3) | (B-1) |
| Preparation Example 4 | (I-4) | (A-4) | (B-1) |

<Preparation of Rinsing Liquid>

The compound [C] and the solvent [D] for use in the preparation of the rinsing liquid (composition (II)) are shown in the following.

| | (Compound [C]) |
|---|---|
| C-1: | N,N-dimethyl-4-aminopyridine (DMAP) |
| C-2: | diazabicycloundecene (DBU) |
| C-3: | toluene sulfonic acid (TsOH) |
| C-4: | N,N-dimethylformamide (DMF) |

(Solvent [D])

D-1: propylene glycol monomethyl ether acetate

Preparation Examples 5 to 9

With use of the compound [C] and the solvent [D] shown in the following Table 2, 100 parts by mass of the compound [C] and 9900 parts by mass of the solvent [D] were mixed. The resulting mixture solution was filtrated with a membrane filter having a pore diameter of 200 nm, so that the composition (II) shown in the Table 2 was prepared as the rinsing liquid.

TABLE 2

| | Composition (II) | Compound [C] | Solvent [D] |
|---|---|---|---|
| Preparation Example 5 | (II-1) | (C-1) | (D-1) |
| Preparation Example 6 | (II-2) | (C-2) | (D-1) |
| Preparation Example 7 | (II-3) | (C-3) | (D-1) |
| Preparation Example 8 | (II-4) | (C-4) | (D-1) |
| Preparation Example 9 | (II-5) | — | (D-1) |

<Formation and Evaluation of Film>

Example 1

A silicon dioxide (SiO$_2$) substrate and a tungsten (W) substrate as a metal film were prepared, and the surfaces of the SiO$_2$ substrate and the W substrate were washed with 50 mass % citric acid aqueous solution. Subsequently, each of the SiO$_2$ substrate and the W substrate was coated with the composition (I-1) by spin coating (1500 rpm, 20 seconds), followed by baking at 230° C. for 30 minutes with a hot plate. The substrate was then cooled to room temperature. Subsequently, onto the polymer brush film formed on each of the SiO$_2$ substrate and the W substrate, the composition (II-1) as rinsing liquid was dropped, so that the washing treatment (peeling treatment) was performed. After the peeling treatment, the contact angle on the substrate surface was measured with DSA30S (manufactured by KRUSS), and the film thickness of the polymer brush film on the substrate surface was measured with an ellipsometer ("M-2000D" manufactured by J. A. Woollam Co. Ltd.). The measurement results (static contact angle of W, static contact angle of $SiO_2$, and film thickness on W) are shown in the following Table 3. Further, based on the measurement results, the $SiO_2$ peeling capability and the film thickness on the W substrate were evaluated. The $SiO_2$ peeling capability was evaluated as follows. Samples having a surface contact angle on $SiO_2$ (i.e., measured value of static contact angle of $SiO_2$) of less than 45° were evaluated as good, and samples other than those are evaluated as poor. Samples having a film thickness on the W substrate of 7.0 nm or more was evaluated as good, and samples other than those are evaluate as poor.

Examples 2 to 4, Comparative Examples 1 to 3, and Reference Examples 1 and 2

Except that the types of the composition (I) and the composition (II) were changed as described in the following Table 3, the polymer brush film was formed, subjected to peeling treatment with a rinsing liquid, and evaluated in the same manner as in Example 1. The evaluation results are shown altogether in the following Table 3.

the same conditions except that the basic compound was replaced with N,N-dimethyl-4-aminopridine (DMAP).

In contrast, in Comparative Examples 1 to 3 with use of the compound (II) containing no basic compound, the static contact angle on the $SiO_2$ region was large even after peeling treatment, so that the polymer was insufficiently removed from above the $SiO_2$ region.

Obviously, numerous modifications and variations of the present invention are possible in light of the above teachings. It is therefore to be understood that within the scope of the appended claims, the invention may be practiced otherwise than as specifically described herein.

What is claimed is:

1. A method for producing a film, comprising:
   coating a surface of a substrate with a composition comprising a polymer and a solvent to form a coating film on the surface of the substrate, the substrate comprising: a first region comprising at least one metal selected from the group consisting of copper, iron, zinc, cobalt, aluminum, titanium, tin, tungsten, zirconium, tantalum, germanium, molybdenum, ruthenium, gold, silver, platinum, palladium and nickel; and a second region different from the first region and comprising silicon, in a surface layer thereof;
   heating the coating film; and
   removing, with a rinsing liquid, the coating film on the second region while keeping the coating film on the first region remained, after the heating,

TABLE 3

|   | Composition (I) | Composition (II) | Static contact Angle of w (°) | Static contact Angle of $SiO_2$ (°) | $SiO_2$ peeling capability | Film thickness on W (nm) | Evaluation results |
|---|---|---|---|---|---|---|---|
| Example 1 | (I-1) | (II-1) | 63.0 | 43.9 | Good | 7.6 | Good |
| Example 2 | (I-1) | (II-2) | 63.0 | 39.8 | Good | 7.5 | Good |
| Example 3 | (I-2) | (II-2) | 63.1 | 39.7 | Good | 7.7 | Good |
| Example 4 | (I-3) | (II-2) | 63.0 | 39.9 | Good | 7.5 | Good |
| Comparative Example 1 | (I-1) | (II-3) | 62.9 | 50.3 | Poor | 7.4 | Good |
| Comparative Example 2 | (I-1) | (II-4) | 63.0 | 46.3 | Poor | 7.5 | Good |
| Comparative Example 3 | (I-1) | (II-5) | 62.9 | 55.7 | Poor | 7.5 | Good |
| Reference Example 1 | (I-4) | (II-5) | 62.9 | 39.7 | Good | 3.5 | Poor |
| Reference Example 2 | — | (II-5) | 31.2 | 39.5 | — | 0 | — |

As shown in the results, with use of the composition (I) containing a polymer having a number average molecular weight above a certain value, increase in the film thickness of the polymer brush film was achieved. Further, in Examples 1 to 4 with use of the composition (II) containing a basic compound, the polymer was able to be removed from the $SiO_2$ region while the film thickness of the polymer brush film on the tungsten (W) region was sufficiently maintained, so that excellent $SiO_2$ peeling capability was exhibited. In particular, in Example 2 with use of diazabicycloundecene (DBU) as the basic compound, the static contact angle on the $SiO_2$ region was sufficiently small and had excellent $SiO_2$ peeling capability in comparison with that in Example 1 with a polymer brush film formed under wherein the polymer comprises, at a terminal portion of a main chain thereof, at least one functional group selected from the group consisting of: a group having a carbon-carbon unsaturated bond; a carboxy group; a cyano group; an alcoholic hydroxy group; a thiol group; —$NR^4R^5$; —CO—$NR^4R^5$; —$SO_2R^4$; —$P(=O)(OR^4)(OR^5)$; and a group comprising a nitrogen-containing heterocycle, wherein $R^4$ and $R^5$ are each independently a hydrogen atom or a monovalent hydrocarbon group having 1 to 6 carbon atoms, the polymer further comprises a structural unit represented by formula (1), and has a number average molecular weight of 13000 or more, and the rinsing liquid comprises a solvent and a basic compound dissolved or dispersed in the solvent:

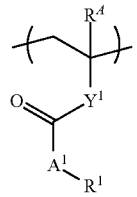

(1)

wherein $R^4$ is a hydrogen atom, a halogen atom, an alkyl group having 1 to 8 carbon atoms, or a halogenated alkyl group having 1 to 8 carbon atoms; $Y^1$ is a single bond, —CO—NR$^2$—, a divalent aromatic ring group, a divalent group comprising —O—, or a divalent group comprising —CO—NR$^2$—; $R^2$ is a hydrogen atom or an alkyl group having 1 to 5 carbon atoms; $A^1$ is a single bond, —O—, —S—, or —NR$^3$—; $R^3$ is a hydrogen atom or an alkyl group having 1 to 5 carbon atoms; $R^1$ is a hydrogen atom, a monovalent hydrocarbon group, a monovalent halogenated hydrocarbon group, or a monovalent group comprising a heterocyclic structure; and $R^1$ is not a hydrogen atom when $A^1$ is a single bond.

2. The method for producing a film according to claim 1, wherein the polymer comprises 50 mol % or more of the structural unit represented by the formula (1) relative to total structural units constituting the polymer.

3. The method for producing a film according to claim 1, wherein the basic compound included in the rinsing liquid has an acid dissociation constant of 5.2 or more.

4. The method for producing a film according to claim 1, wherein the basic compound included in the rinsing liquid is at least one selected from the group consisting of an amine compound, an aromatic heterocyclic compound, ammonia, and ammonium hydroxide.

5. The method for producing a film according to claim 1, wherein the basic compound included in the rinsing liquid is at least one selected from the group consisting of diazabicycloundecene, 1,4-diazabicyclo[2,2,2]octane, tetramethylammonium hydroxide, tetrabutylammonium hydroxide, and ammonia.

6. The method for producing a film according to claim 1, wherein the basic compound included in the rinsing liquid has an acid dissociation constant of 5.2 or more, and is at least one compound selected from the group consisting of an amine compound, an aromatic heterocyclic compound, ammonia, and ammonium hydroxide.

7. The method for producing a film according to claim 6, wherein a content of the basic compound in the rinsing liquid relative to a total mass of the rinsing liquid is 0.05 mass % or more and 20 mass % or less.

8. The method for producing a film according to claim 6, wherein a content of the basic compound in the rinsing liquid relative to a total mass of the rinsing liquid is 0.1 mass % or more and 10 mass % or less.

9. The method for producing a film according to claim 6, wherein a content of the basic compound in the rinsing liquid relative to a total mass of the rinsing liquid is 0.2 mass % or more and 5 mass % or less.

10. The method for producing a film according to claim 1, wherein the solvent in the rinsing liquid comprises at least one selected from the group consisting of an alcohol, an ether, a ketone, an amide, an ester, and a hydrocarbon.

11. The method for producing a film according to claim 1, wherein the polymer comprises, at a terminal portion of a main chain thereof, at least one functional group selected from the group consisting of: a group having a carbon-carbon unsaturated bond; a cyano group; an alcoholic hydroxy group; a thiol group; —NR$^4$R$^5$; —CO—NR$^4$R$^5$; —SO$_2$R$^4$; —P(=O)(OR$^4$)(OR$^5$); and a group comprising a nitrogen-containing heterocycle, at a polymer chain terminal part of the polymer, wherein $R^4$ and $R^5$ are each independently a hydrogen atom or a monovalent hydrocarbon group having 1 to 6 carbon atoms.

12. The method for producing a film according to claim 1, wherein the first region comprises at least one metal selected from the group consisting of copper, cobalt, tungsten, tantalum and ruthenium.

13. The method for producing a film according to claim 1, wherein the second region comprises Si—OH, Si—H or Si—N in a surface thereof.

14. The method for producing a film according to claim 1, wherein the second region comprises Si—OH in a surface thereof.

15. The method for producing a film according to claim 1, wherein a content of the basic compound in the rinsing liquid relative to a total mass of the rinsing liquid is 0.05 mass % or more and 20 mass % or less.

16. The method for producing a film according to claim 1, wherein a content of the basic compound in the rinsing liquid relative to a total mass of the rinsing liquid is 0.1 mass % or more and 10 mass % or less.

17. The method for producing a film according to claim 1, wherein a content of the basic compound in the rinsing liquid relative to a total mass of the rinsing liquid is 0.2 mass % or more and 5 mass % or less.

18. The method for producing a film according to claim 1, wherein the basic compound included in the rinsing liquid has an acid dissociation constant of 5.5 or more.

19. The method for producing a film according to claim 1, wherein the basic compound included in the rinsing liquid has an acid dissociation constant of 7.0 or more.

20. The method for producing a film according to claim 1, wherein a thickness of the coating film formed on the first region of the substrate after removing the coating film on the second region is 5.0 nm or more.

* * * * *